United States Patent [19]

Mutchler et al.

[11] Patent Number: 5,253,185
[45] Date of Patent: Oct. 12, 1993

[54] VALVE DIAGNOSTIC SYSTEM INCLUDING AUXILIARY TRANSDUCER BOX

[75] Inventors: John H. Mutchler, Wethersfield; William D. Marriott, Ellington, both of Conn.

[73] Assignee: Combustion Engineering, Inc., Windsor, Conn.

[21] Appl. No.: 647,915

[22] Filed: Jan. 30, 1991

[51] Int. Cl.$^5$ .................... G06F 15/20; G08B 21/00
[52] U.S. Cl. .................. 364/551.01; 364/509; 137/487.5
[58] Field of Search .......... 364/551.01, 558, 552, 364/509, 510; 73/168, 862.32; 137/487.5

[56] References Cited

U.S. PATENT DOCUMENTS

| | | | |
|---|---|---|---|
| 4,694,390 | 9/1987 | Lee | 137/487.5 |
| 4,816,987 | 3/1989 | Brooks et al. | 137/487.5 |
| 4,855,729 | 8/1989 | Takguchi et al. | 137/487.5 |
| 4,976,144 | 12/1990 | Fitzgerald | 137/487.5 |
| 5,109,692 | 5/1992 | Fitzgerald | 137/487.5 |

OTHER PUBLICATIONS

Soviet Patent Abstracts, PQ General/Mechanical, week 9109 Apr. 17, 1991, Derwent Publications Ltd. EP, A1, 0 309 643 (Landis & Gyr) Apr. 5, 1989.

Primary Examiner—Jack B. Harvey
Assistant Examiner—Ellis B. Ramirez
Attorney, Agent, or Firm—L. James Ristas; John H. Mulholland

[57] ABSTRACT

Equipment for acquiring diagnostic data from a valve train parameter that changes as a result of the operation of a valve (14) in a process plant is positioned as an auxiliary data acquisition unit (200) in the vicinity of the valve train. A plurality of sensor lines (P3, P4) are connected between the auxiliary unit and locations in the valve train where the parameter changes. The valve is operated so as to generate parameter signals manifested in a first physical form in the sensor lines. In the auxiliary unit, the physical form of the parameter signals is converted into diagnostic signals (E10, E11) having a different physical form. The diagnostic signals are transmitted to a base data acquisition unit (100) that is physically distinct from the auxiliary unit.

23 Claims, 1 Drawing Sheet

VALVE DIAGNOSTIC SYSTEM INCLUDING AUXILIARY TRANSDUCER BOX

BACKGROUND OF THE INVENTION

The present invention relates to valve diagnostics, and more particularly, to the diagnosis of valves that are installed in process plant flow lines.

Many types of solenoid and control valves are typically present in process plants dedicated, for example, to producing electrical power, refining materials, or producing food. In many such plants, reliable valve operation not only affects the efficiency of the process or the quality of the product, but may also have severe safety consequences. Safety considerations are particularly relevant in nuclear power plants.

Accordingly, it is desirable that some indicator of reliability be obtainable from measurable characteristics of the valve while installed in the flow line, i.e., without removing, disassembling, inspecting, reassembling, and reinstalling the valve. In this context, reliability refers not only to the availability of the valve to operate when actuated, but also the effectiveness of the operation, i.e., stroking from a fully open to a fully closed position when energized within specified limits.

A known approach to such diagnostics includes energizing the valve while obtaining accurate measurements of, for example, stem thrust or displacement. By analyzing the relationship of stem thrust, movement, or similar dependent variable, to the independent energizing variable, such as electric current, hydraulic pressure, or pneumatic pressure in the actuator, certain valve behaviors indicative of reliability can be inferred. Conventionally, such diagnostic techniques rely on the connection of specially adapted sensors to the individual valve or its associated components, with the sensor output delivered to a portable data acquisition unit which is temporarily located in the vicinity of the valve.

With a growing desire to reduce the time required to obtain data from many valves in the plant, and to obtain more kinds of data that are useful for diagnostic purposes, the need has arisen for greater flexibility of the equipment and methods utilized to acquire diagnostic data.

SUMMARY OF THE INVENTION

It is, accordingly, an object of the present invention to increase the flexibility for acquiring valve diagnostic data with a dedicated data acquisitioner unit.

It is a more particular object to augment the capabilities of a data acquisition base unit situated near one valve, by locating an auxiliary unit near another valve and transmitting measurements acquired at the second valve to the base unit at the first valve.

It is yet another object to provide an auxiliary data acquisition unit whereby data variables in one signal form are converted into electrical signals by the auxiliary unit, for transmittal to electrical input ports on a remote base unit.

One embodiment of the invention is used for acquiring data from valves in process plant flow lines, wherein each valve has a flow bore, means for sealing the flow bore against flow, stem means connected to the means for sealing, and a fluidly driven actuator for selectively moving the stem means between open and closed positions whereby the means for sealing opens and closes the flow bore respectively. A portable data acquisition unit is locatable in the vicinity of one of the valves, and has a plurality of electrical input ports for receiving diagnostic signals associated with the one valve. An auxiliary unit that is physically distinct from the acquisition unit, is located at another valve. The auxiliary unit has a pressure input port that is sensitive to variations in fluid pressure. The input port is fluidly connected at the other valve so as to experience a variation in fluid pressure during actuation of the other valve, and has first output means connected to the input port of the data acquisition unit, for converting variations in presssure at the auxiliary unit input port to a commensurate electrical output signal for delivery as a diagnostic signal to the input port of the data acquisition unit. Preferably, the auxiliary unit also includes means for converting one type of electrical signal, such as voltage or current, into another type of electrical signal, such as current or voltage, respectively.

Alternatively, the auxiliary unit can be used in conjunction with a base unit to obtain a wider variety of data from a single valve or associated valve train.

A general method for acquiring diagnostic data from valves in a process plant according to the invention, includes the steps of positioning a data acquisition unit in the vicinity of one valve and measuring an operating characteristic of the one valve with the acquisition unit. A physically distinct auxiliary unit is positioned in the vicinity of another valve. In the auxiliary unit, a variable indicative of an operating characteristic of the other valve is sensed and transformed into a diagnostic signal commensurate with the variable. The diagnostic signal is then sent from the auxilliary unit to the data acquisition unit.

With the auxiliary unit used in conjunction with a basic data acquisition unit of the type described below, a relatively large number of electrical signals (current or voltage) in a pneumatic or hydraulic control loop of the valve, can be monitored. This includes but is not limited to signals associated with E/P or I/P positioners, solenoids, limit switches, position indicators and controllers. Additionally, the user may temporarily install and monitor a variety of instruments to assist in monitoring valve performance. These include strain gauges, load cells, accelerometers, and thermocouples. Although the base test unit preferably includes a sufficient number of electrical input ports and appropriate recording channels to permit the user to obtain significantly more data than had previously been acquired for valve diagnosis in the field, this capability is augmented by the auxiliary unit, which has the capability to monitor additional pneumatic and hydraulic pressures remote from the base unit.

The auxiliary unit includes several pressure transducers which tie into the base unit. By using one or more auxiliary units, multiple pressure signals (pneumatic or hydraulic) can be monitored from, and recorded in, the base unit. This allows the user to monitor up to, for example, twelve pressure channels for one valve, or to simultaneous monitor fewer pressure channels but from more than one valve. The auxiliary unit can be tied in closer to the pressure source to reduce pressure lag, relative to a direct connection to the base unit. The auxiliary unit also allows for conversion of current signals into voltage signals for delivery to voltage sensitive ports in the base unit, or vice versa.

In general, the auxiliary unit according to the invention receives sensed valve parameter signals in one form remote from a base data acquisition unit, and converts the signals into another form that is transmitted to the base unit. Preferably, pressure signals are converted to electrical voltage or current signals.

BRIEF DESCRIPTION OF THE DRAWING

These and other objects and advantages of the invention will be described below in the context of the preferred embodiment, with reference to the accompanying drawing, in which.

DESCRIPTION OF THE PREFERRED EMBODIMENT

Figure 1:
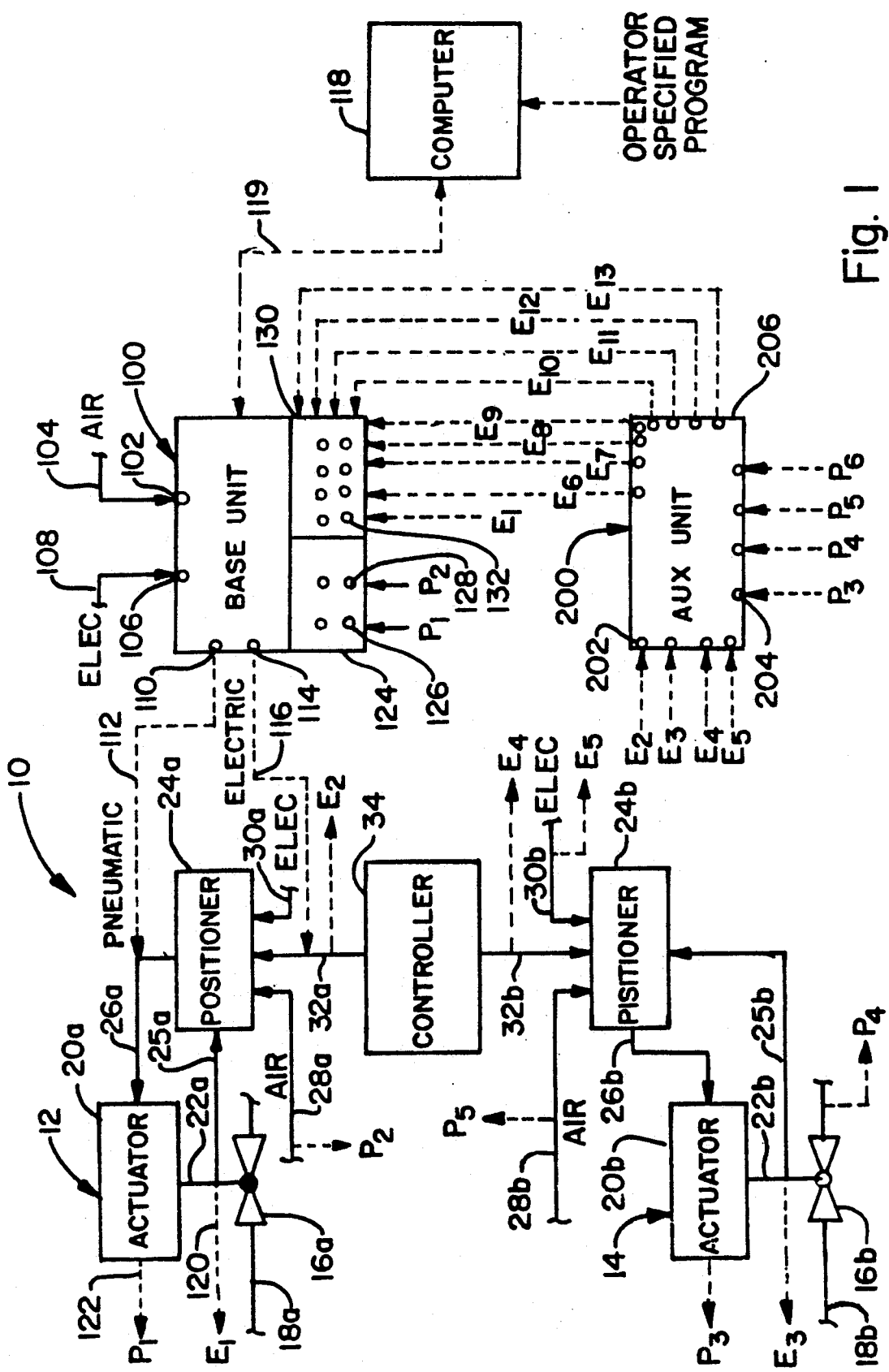
FIG. 1 is a schematic of the auxiliary unit of the invention, as part of a more comprehensive valve diagnostic system.

FIG. 1 is a schematic representation of the invention installed at part of a system 10 for acquiring data from valves 12,14. For convenience, structures found on both valves have been given the same muneric identifier, except that those associated with valve 12 will have the suffix "a" and those associated with valve 14, "b". When similar structures on both valves are referenced, the suffix will not be used. These valves may be of substantially any type, and in any event would include a valve body 16a,16b which has a flow bore (not shown) in fluid communication with the respective process flow line 18. It will be understood that each valve has means within the body for sealing the flow bore against flow. A stem, shaft, or similar transmission element 22 (hereinafter generally referred to as "stem") is moved by the valve actuator 20, whereby the stem 22 positions the sealing member within the valve body between open and closed flow conditions.

Although usable for testing other types of valves, the present invention will be described in the context of fluidly operated valves, whereby the actuator is energized by pneumatic or hydraulic pressure. Typically, each valve train includes an associated positioner 24 which has an output line 26 through which fluid pressure is delivered at a controlled rate to the respective actuator 20. The positioner inputs would, in the case of a pneumatic valve, include a source of compressed air 28, and a source of electric power 30. Both the initiation and time dependency of the pressure supplied by the positioner 24 to the actuator 20, is specified by a valve controller 34 via an electrical line 32. The controller is typically remote from the positioner 24, e.g., the controller 34 is in the plant central control room, whereas the positioner 24 is on or at the valve. Typically, for control valves, the positioner 24 receives as an input, a signal from line 25, commensurate with the position of the stem 22. The position data from input 25 are compared with the demand or desired position from signal 32, according to conventional logic within positioner 24, whereby the appropriate pressure is delivered to actuator on line 26.

A diagnostic or test base unit 100 is connectable to at least one valve 12, and associated valve train, preferably with the capability of superseding or overriding the controller 34 and/or positioner 24, whereby the valve can be actuated according to a predetermined, time-dependent program. The base unit 100 has a first input port 102 connectable to a source 104 of fluid pressure, e.g., compressed air. This source may either be transported to the vicinity of the valve along with the base unit 100, or, in a more typical situation, source line 104 is connected to air pressure lines that are available throughout the process plant. Similarly, a second input port 106 is connectable to a source of electrical power 108, such as an electrical outlet in the plant.

The base unit 100 has a first output port 110 that is fluidly connected within the unit to port 102, for delivering a controlled fluid pressure from the unit along line 112. Line 112 is selectively connectable to line 26, i.e., directly to actuator 20, downstream of positioner 24a. A second output port 114 is electrically connected within the base unit to the second input port 106, for delivering a controlled electrical signal from the unit on electric line 116. The control signal on line 116 emulates the control signal normally provided by controller 34 along line 32a. When line 116 is input to positioner 24a, via line 32a or otherwise, the valve 12 can be controlled through its positioner 24a, independently of the controller 34.

It should be appreciated that it is well within the skill of the ordinary practitioner in this field to transform a supply of compressed air at a given pressure in line 104, into a time-dependent pressure variation in line 112, and, similarly, to transform a source of electrical power at 110 volts A.C., into a time-dependent D.C. voltage signal along line 116. Thus, the unit 100 includes test program means for converting the fluid pressure at the first input port 102 into a controlled, time-dependent fluid pressure at the first output port 110, and for converting electrical power at the second input port 106 into a controlled, time-dependent electrical signal at the second output port 114.

The test program means can include conventional transformer hardware with dials or the like, whereby the operator can vary the outputs at ports 110,114 manually. In a more desirable implementation, particular, predetermined, time-dependent output pressures and voltages at ports 110,114 are specified by several different converter or transformer paths within the unit, with switches whereby the operator can select one of the plurality of "hard wired" pressure and electrical test programs. In the preferred embodiment, a computer 118, which may be integral with or separate from the base unit 100, specifies the test programs. As used herein, the term "computer" is intended to mean a programmable microprocessor, with or without associated peripherals such as a digital mass storage device, keyboard and display, or equivalent interfaces. The important aspect of the computer 118 is that a time-dependent fluid pressure, and a time-dependent electrical signal, are independently specified and output from the unit 100 as a result of test programs that are stored in, and executed by, the digital processing means associated with the unit.

The portable base unit 100 and associated digital processor 118 ar positioned in the vicinity of a valve 12 to be tested. Actuator 20a, for operating the valve, can be energized in the most straightforward manner by connecting pneumatic line 112 from port 110 directly to the actuator 20, typically through a T fitting in line 26a. The positioner 24a is then overridden or otherwise deactivated by any of a variety of available techniques such as shutting off air and electrical sources 28a,30a, or sending an appropriate signal along line 32a from the controller 34. In this mode of operation, the actuator 20a is energized solely and directly by the pressure in line 112, which has a time-dependence specified independently of the controller 34, by the test program stored or otherwise defined by the unit 100.

A significant advantage of energizing the actuator 20a via the test program and line 112, is that a time-dependent energizing that would not ordinarily be useful for flow control purposes, but which would be revealing of information useful for diagnostic purposes, can be achieved with the present invention, without modification of the normal control algorithm in controller 34. Moreover, with the computer-implemented embodiment, the operator can select either a known, stored program for execution of the pressure control on line 112, or the operator can modify (and reproduce) the pressure amplitude, or time dependency during the course of performing a sequence of valve energizing cycles. The information flow along line 119 can flow between a base unit and distinct computer 118 as shown in FIG. 1, or the flow can be entirely within the base unit if the computer is incorporated therein.

The unit 100 is used in conjunction with a direct measurement of the actuator pressure P1 at 122, and the direct measurement of stem movement as manifested by a sensor voltage El at 120. Preferably, the base unit 100 includes a measurement input section 124 having a plurality of pressure input ports such as 126,128. Line 122 is directly attached to actuator 20a, and directly connected to measurement port 126. Pressure transducers internal to the base unit 100 convert pressure variations into measured values which are recorded, preferably on magnetic memory or the like associated with computer 118.

Base unit 100 also preferably includes an electrical measurement input section 130 including a plurality of electrical input ports 132, for receiving electrical signals of interest to the diagnostic analysis. One such signal is E1, the voltage output from an LVDT or other intrusive or not intrusive sensor that is responsive to the movement or thrust of stem 22a or similar member in the thrust transmission between the actuator 20a and the valve member in body 16a. It should be appreciated that other pressure and/or electrical signals indicative of valve operation or condition, such as the pressure in positioner air supply line 28a, represented at P2, can be input to the base unit at, for example, port 128.

The base unit 100 has been described above, in terms of its unique capability to override the controller 34 so as to energize the valve 12 according to a desired or known time dependency. The unit output can be pneumatic when it is desired that the positioner be bypassed, or electrical when it is desired that the operation of the positioner be included within the diagnosis.

As shown in FIG. 1, the base unit 100 is preferably used in conjunction with an auxiliary unit 200 in accordance with the present invention, whereby a variety of additional measurement data can be acquired for a single valve 12, or a plurality of valves 12,14. It should be appreciated that the auxiliary unit 200 can be used with a base unit that, unlike the unit 100 described above, does not have the program controlled outputs from ports 110,114. Moreover, the base unit is not required to be portable or locatable in the vicinity of a valve, although it is preferred that both units 100 and 200 be portable.

With reference now to a general auxiliary unit 200, there are shown a plurality of electrical inputs E2-E5. Signal E2 is delivered to the auxiliary unit as a measurement of the electrical control signal from controller 34 as delivered along line 32a to positioner 24a. The controller 34 would normally be remote from valve 12, and therefore temporarily installing a direct electrical line from the controller to the base unit 100, which is at valve 12, would not be convenient. The auxiliary unit 200 can be near controller 34, remote from both the base unit 100 and the valve 12 to be tested, thereby affording the flexibility to receive a voltage signal E2 in the auxiliary unit and to amplify or otherwise condition the signal E2 for delivery from an electrical output port 206, as electrical signal E6 to section 130 of the base unit. Signal E4 on line 32b can also be handled in this fashion for auxiliary unit output E8.

Similarly, auxiliary unit 200 can be located in the vicinity of valve 14, to receive the electrical signal E3 from the stem displacement sensor, into a port 202 for delivery through port 206 and line E7 to base unit section 130.

In another variation, the current supplied by a source of electrical power, for example at line 30b, may be readily sensed, but the input at a port 132 of the base unit may be adapted to receive a voltage rather than a current signal. The auxiliary unit 200 can in this instance receive a current signal E5 through an input port 202, and deliver a commensurate voltage signal through an output port E9.

The auxiliary unit 200 also has a plurality of pressure input ports 204 which receive varying fluid pressures through lines P3, P4, P5 and P6, each of which is converted by a transducer into a commensurate electrical output signal E10, Ell, E12 and E13, for delivery to section 130 of base unit 100. Although the base unit 100 may have pressure input ports 126,128 in section 124 for connection to a nearby valve such as 12, the receipt of direct pressure variations from a more remote valve such as 14, would degrade the measurement. Accordingly, with the auxiliary unit 200 situated near the other valve 14, pressure measurements such as P3 from actuator 20b can be delivered to the auxiliary unit 200 and converted to an electrical signal for delivery over a longer distance without degradation, to the base unit 100.

It should be appreciated that the axuiliary unit 200 can have any desired number of electrical and pneumatic input ports 202 and 204, and a corresponding number of electrical output ports 206. As an example, at least eight, and preferably twelve ports 206, and a corresponding number of electrical input ports 132 on base unit 100, has been found desirable.

What is claimed is:
1. In a system for acquiring data from valves in process plant flow lines, wherein each valve has a flow bore, means for sealing the flow bore against flow, stem means connected to the means for sealing, and a fluidly driven actuator for selectively moving the stem means between open and closed positions whereby the means for sealing opens and closes the flow bore respectively, the system includes a portable data acquition unit locatable in the vicinity of one of the valves and having a plurality of electrical input ports for receiving diagnostic signals associated with said one valve, and wherein the improvement comprises:
 an auxiliary unit that is physically distinct from the acquisition unit and located at another valve, the auxiliary unit having a pressure input port that is sensitive to variations in fluid pressure, the input port being fluidly connected at the other valve so as to experience a variation in fluid pressure during actuation of the other valve, and first output means connected to the input port of the data acquisition unit, for converting variations in presssure at the auxiliary unit input port to a commensurate electri- cal output signal for delivery as a diagnostic signal to the input port of the data acquisition unit.

2. The improved system of claim 1, wherein the auxiliary unit input port is fluidly connected to the actuator of the other valve.

3. The improved system of claim 1, wherein the auxiliary unit input port is fluidly connected to the flow line associated with the other valve.

4. The improved system of claim 1, wherein the other valve includes a positioner having a pressure source line and a pressure output line, and wherein the auxiliary unit input port is fluidly connected to one of the positioner pressure source or pressure output line.

5. The improved system of claim 1, wherein the auxiliary unit includes an electrical input port that is sensitive to variations in one of voltage or current, and second output means connected to an input port of the data acquisition unit, for converting variations in voltage at the electrical input port to commensurate variations in output current or converting variations in current at the electrical input port to commensurate variations in output voltage, respectively, for delivery as a diagnostic signal to an input port of the data acquisition unit.

6. The improved system of claim 1, wherein the first output means includes at least eight electrical output ports.

7. The improved system of claim 5, wherein the first and second output means include a total of at least eight electrical output ports.

8. In a system for acquiring diagnostic data from a valve train for a process plant flow line, wherein the valve train includes a flow bore, means for sealing the flow bore against flow, stem means connected to the means for sealing, a fluidly driven actuator for selectively moving the stem means between open and closed positions whereby the means for sealing opens and closes the flow bore respectively, a valve positioner responsive to a process control signal, for fluidly energizing the actuator commensurately with the process control signal, and a valve process controller remote from the valve, for generating the process control signal, and the system includes a data acquisition unit having a plurality of electrical input ports for receiving diagnostic signals from the valve train, and wherein the improvement comprises:

an auxiliary unit that is physically distinct from the acquisition unit, the auxiliary unit having a plurality of pressure input ports that are each sensitive to variations in fluid pressure, at least one of the input ports being fluidly connected to a point in the valve train that can experience a variation in fluid pressure during operation of the valve, and first output means connected to at least one of the input ports of the data acquisition unit, for converting variations in presssure at the pressure input ports to commensurate electrical output signals, and delivering the electrical output signals as first diagnostic input signals to the input ports of the data acquisition unit.

9. The improved system of claim 8, wherein the auxiliary unit includes a plurality of electrical input ports that are each sensitive to variations in one of voltage or current, and second output means connected to at least one of the input ports of the data acquisition unit, for converting variations in voltage at the electrical input ports to commensurate variations in output current and converting variations in current at the electrical input ports to commensurate variations in output voltage, respectively, for delivery as second diagnsotic signals to the input ports of the data acquisition unit.

10. The improved system of claim 8, wherein the first output means includes at least eight electrical output ports.

11. The improved system of claim 9, wherein the first and second output means include a total of at least eight electrical output ports.

12. The improved system of claim 8, wherein both the data acquisition unit and the auxiliary unit are portable in the vicinity of the process plant flow lines.

13. The improved system of claim 8, wherein at least one of the data acquisition unit input ports is connected to one valve train and at least one of the auxiliary unit input ports is connected to another valve train.

14. A method for acquiring diagnostic data from valves in a process plant, wherein the method comprises the steps of:

positioning a data acquisition unit in the vicinity of one valve;

measuring an operating characteristic of said one valve with the acquisition unit;

positioning a physically distinct auxiliary unit in the vicinity of another valve;

sensing in the auxilliary unit, a variable indicative of an operating characteristic of said other valve;

transforming the sensed variable into a diagnostic signal commensurate with the variable; and sending the diagnostic signal from the auxilliary unit to the data acquisition unit.

15. The method of claim 14, wherein the valves are fluidly actuated and said variable is fluid pressure.

16. The method of claim 15, wherein the diagnostic signal is an electrical signal commensurate with the fluid pressure.

17. The method of claim 14, wherein the variable is an electrical voltage and the diagnostic signal is an electric current commensurate with the voltage.

18. The method of claim 14, wherein the variable is an electric current and the diagnostic signal is an electric voltage commensurate with the current.

19. A method for acquiring diagnostic data from at least one valve train parameter that changes as a result of the operation of a valve in a process plant, comprising the steps of:

positioning an auxiliary data acquisition unit in the vicinity of the valve train;

connecting a plurality of sensor lines between the auxiliary unit and locations in the valve train where said at least one parameter changes;

operating the valve so as to generate parameter signals manifested in respective first physical form in the sensor lines;

in the auxiliary unit, converting the first physical forms of the paramater signals into diagnostic signals having respective different physical forms; and transmitting the diagnostic signals to a base data acquisition unit that is physically distinct from the auxiliary unit.

20. The method of claim 19, wherein the valve is fluidly actuated and the step of connecting sensor lines includes connecting to at least two locations where the fluid pressure parameter changes.

21. The method of claim 20, wherein
the parameter signals are manifested in the sensor lines in the physical form of pressure variations, and the pressure variations are converted in the auxiliary unit, into diagnostic signals in the physical form of variations of one of electrical voltage or current.

22. The method of claim 19, wherein the valve is fluidly actuated in response to an electrical control signal and the step of connecting sensor lines includes connecting at least one pressure line to a location where the fluid pressure changes and connecting at least one electrical line to a location where said electrical control signal changes, and the step of converting includes converting fluid pressure manifested in the pressure line, into an electrical diagnostic signal.

23. The method of claim 22, wherein said electrical line manifests one of a voltage or current and the step of converting includes converting the manifested voltage or current into a current or voltage diagnostic signal, respectively.

* * * * *